US008923804B1

(12) United States Patent
Aldridge, II et al.

(10) Patent No.: US 8,923,804 B1
(45) Date of Patent: Dec. 30, 2014

(54) NOTIFICATION DEVICE FOR CELLULAR TELEPHONE

(71) Applicant: Trellie, Inc., Leawood, KS (US)

(72) Inventors: Claude N. Aldridge, II, Leawood, KS (US); Jason C. Reid, Fairway, KS (US)

(73) Assignee: Trellie, Inc., Overland Parks, KS (US)

( * ) Notice: Subject to any disclaimer, the term of this patent is extended or adjusted under 35 U.S.C. 154(b) by 0 days.

(21) Appl. No.: 13/692,325

(22) Filed: Dec. 3, 2012

(51) Int. Cl.
*H04W 4/22* (2009.01)
*H04W 68/00* (2009.01)
*H04W 4/00* (2009.01)

(52) U.S. Cl.
CPC .............. *H04W 68/005* (2013.01); *H04W 4/00* (2013.01); *H04W 4/008* (2013.01)
USPC ................... 455/404.2; 455/404.1; 455/412.1

(58) Field of Classification Search
USPC ............... 455/412.2, 420, 41.2, 569.1, 412.1, 455/567, 228, 404.1, 404.2
See application file for complete search history.

(56) References Cited

U.S. PATENT DOCUMENTS

| | | | |
|---|---|---|---|
| 5,404,391 A | 4/1995 | Wavroch et al. | |
| 5,848,362 A | 12/1998 | Yamashita | |
| 6,650,231 B1 * | 11/2003 | Byrne | 455/567 |
| 6,697,647 B2 | 2/2004 | Higuchi et al. | |
| 6,934,515 B2 | 8/2005 | Wallach | |
| 7,016,707 B2 | 3/2006 | Fujisawa et al. | |
| 7,203,524 B2 | 4/2007 | Tushinsky et al. | |
| 7,474,889 B2 | 1/2009 | Bhakta et al. | |
| 7,898,395 B2 | 3/2011 | Green | |
| 7,945,292 B2 | 5/2011 | Sweeney et al. | |
| 7,996,046 B2 | 8/2011 | Vargas et al. | |
| 8,155,630 B2 * | 4/2012 | Scott et al. | 455/414.1 |
| 8,165,640 B2 | 4/2012 | Mullen | |
| 8,255,006 B1 * | 8/2012 | Chavez et al. | 455/567 |
| 8,355,710 B2 * | 1/2013 | Storozuk | 455/419 |
| 2002/0186122 A1 | 12/2002 | Gehlot | |

(Continued)

FOREIGN PATENT DOCUMENTS

| | | |
|---|---|---|
| EP | 1841250 | 10/2007 |
| JP | 2001-111653 | 4/2001 |
| WO | WO 2011/063516 | 6/2011 |

OTHER PUBLICATIONS

Pebble Technology, Document, "Pebble: E-Paper Watch for iPhone and Android", downloaded on Aug. 9, 2012 from the Internet at www.kickstarter.com/projects/597507018/pebble-e-paper-watch-for-iphone-and-android, published on Apr. 11, 2012 (16 pgs).

(Continued)

*Primary Examiner* — Cong Tran
(74) *Attorney, Agent, or Firm* — Polsinelli PC

(57) ABSTRACT

A notification device for a cellular telephone provides remote notification to a user of activity or events occurring on a paired cellular telephone. In an exemplary embodiment, the notification device includes a communications link operable to couple the notification device to a cellular telephone, an alert mechanism operable to provide at least one alert to a user of the notification device, a controller in communication with the communications link and alert mechanism, and a memory device coupled to the processor for storing configurable parameters of the notification device. The controller is programmed to receive configuration parameters from the cellular telephone and to receive an alert signal from the telephone and activate an alert in response to the received signal. The activated alert may be a sound alert, a light alert, an alphanumeric alert, a vibration alert, or combinations thereof.

37 Claims, 3 Drawing Sheets

(56) References Cited

U.S. PATENT DOCUMENTS

| | | | |
|---|---|---|---|
| 2005/0014534 A1 | 1/2005 | Hareng et al. | |
| 2005/0078829 A1 | 4/2005 | Knechtel et al. | |
| 2005/0272408 A1 | 12/2005 | Wilkes-Gibbs et al. | |
| 2007/0026798 A1 | 2/2007 | Hoogstra | |
| 2007/0205875 A1 | 9/2007 | De Haan | |
| 2007/0265038 A1 | 11/2007 | Kim | |
| 2009/0088207 A1 | 4/2009 | Sweeney et al. | |
| 2010/0134266 A1 | 6/2010 | Breiner | |
| 2010/0174480 A1* | 7/2010 | Trenkle et al. | 701/201 |
| 2011/0059769 A1 | 3/2011 | Brunolli | |
| 2011/0254684 A1 | 10/2011 | Antoci | |
| 2011/0300804 A1 | 12/2011 | Lu | |
| 2012/0052808 A1 | 3/2012 | McMeans | |
| 2012/0108215 A1* | 5/2012 | Kameli | 455/412.2 |
| 2012/0206259 A1* | 8/2012 | Gassaway | 340/540 |
| 2012/0238330 A1 | 9/2012 | Wu | |
| 2012/0329447 A1* | 12/2012 | Gilbert et al. | 455/420 |
| 2013/0017790 A1* | 1/2013 | Oba et al. | 455/41.2 |
| 2013/0268751 A1* | 10/2013 | Preiss et al. | 713/155 |

OTHER PUBLICATIONS

Fossil, Inc./PR Newswire, Article, "Fossil Unveils Watch That Integrates with Cell Phone; Caller ID Stylish Watch Helps You Stay in Touch and in 'Style'", downloaded on Aug. 9, 2012 from the internet at www.prnewswire.com/news-releases/fossil-unveils-watch-that-integrates-with-cell-phone, published on Sep. 28, 2006 (3 pgs).

Uwe Maurer et al., Paper, "eWatch: A Wearable Sensor and Notification Platform", published in Apr. 2006 (4 pgs).

Metawatch, Advertisement, MetaWatch, downloaded from the internet on Aug. 9, 2012 from www.metawatch.org/models/, published 2011 (3 pgs).

Enrico Costanza et al., Paper, "eye-q: Eyeglass Peripheral Display for Subtle Intimate Notifications", published in 2006 (8 pgs).

Google, Article, "Project Glass: what you need to know", downloaded from the internet on Aug. 9, 2012 from www.techradar.com/us/news/video/project-glass-what-you-need-to-know-1078114, published on Jul. 26, 2012 (6 pgs).

* cited by examiner

NOTIFICATION DEVICE FOR CELLULAR TELEPHONE

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

1. Field of the Invention

The present invention is directed to the field of personal communications devices such as cellular telephones, and more particularly to remote notification devices for such personal communications devices.

2. Description of Related Art

Personal communications devices, such as cellular telephones, tablet computers, and the like have become ubiquitous in modern society. In addition to traditional voice communication, those devices increasingly include capabilities such as text messaging, email access, calendaring, music playback, and a host of other functionality. While many devices communicate over cellular telephone networks, it is increasingly common for such devices to operate only on wireless computer networks, e.g., via a Wi-Fi connection. As such, users often supplement, or even replace, the use of traditional or laptop computers with portable communications devices.

In use, personal communications devices are often secured in briefcases, purses, luggage, or pockets of clothes, thus impeding the users' ability to be notified of incoming calls, texts, emails, and other messaging events on the device. Thus, there remains a need in the art for a notification device.

BRIEF SUMMARY OF THE INVENTION

A notification device for a cellular telephone provides remote notification to a user of activity or events on a cellular telephone. In an exemplary embodiment, the notification device includes a communications link operable to couple the notification device to a cellular telephone, an alert mechanism operable to provide at least one alert to a user of the notification device, a controller in communication with the communications link and alert mechanism, and a memory device coupled to the processor for storing configurable parameters of the notification device. The controller is programmed to receive configuration parameters from the cellular telephone and to receive an alert signal from the telephone and activate an alert in response to the received signal. The activated alert may be a sound alert, a light alert, an alphanumeric alert, a vibration alert, or combinations thereof.

Another aspect of the present invention is to configure the parameters of the notification device in response to information received from the cellular telephone. For example, a user interface or application running on the cellular telephone may allow user input of specific parameters or settings which are transmitted to the notification device. Or, information from the cellular telephone such as GPS coordinates, time of day, or other phone settings may be transmitted to the notification device so that the device may alter settings and parameters based on that received information.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF EXEMPLARY EMBODIMENTS

The present invention is directed to notification device for cellular telephones. The device couples to a cellular telephone via a communications link, and provides remote notification and alerts in response to activity and events occurring on the paired telephone. For example, an incoming call or received text message on the cellular telephone may trigger a light, sound, vibration, or alphanumeric display on the notification device. Thus, a user of the device can keep apprised of activity on the phone by referring to the notification device, even when the phone itself is stored, for example, in a briefcase or purse.

It should be understood that the term "cellular telephone" as used in the specification and claims is used broadly in its colloquial sense to refer to any personal communications device, such as cellular telephones, smart phones, tablet computers, personal digital assistants (PDAs), iPods, iPads, and other such devices known in the art, even if such device does not communicate on cellular frequencies, and even if the device does not provide telephone service—for example, devices operating on Wi-Fi network. It should be further understood that the exemplary embodiments as described herein are not limiting, but are merely representative of embodiments encompassed by the present invention. Other combinations of the various features described herein are within the scope of the present invention and will be apparent to those skilled in the art.

Figure 1:
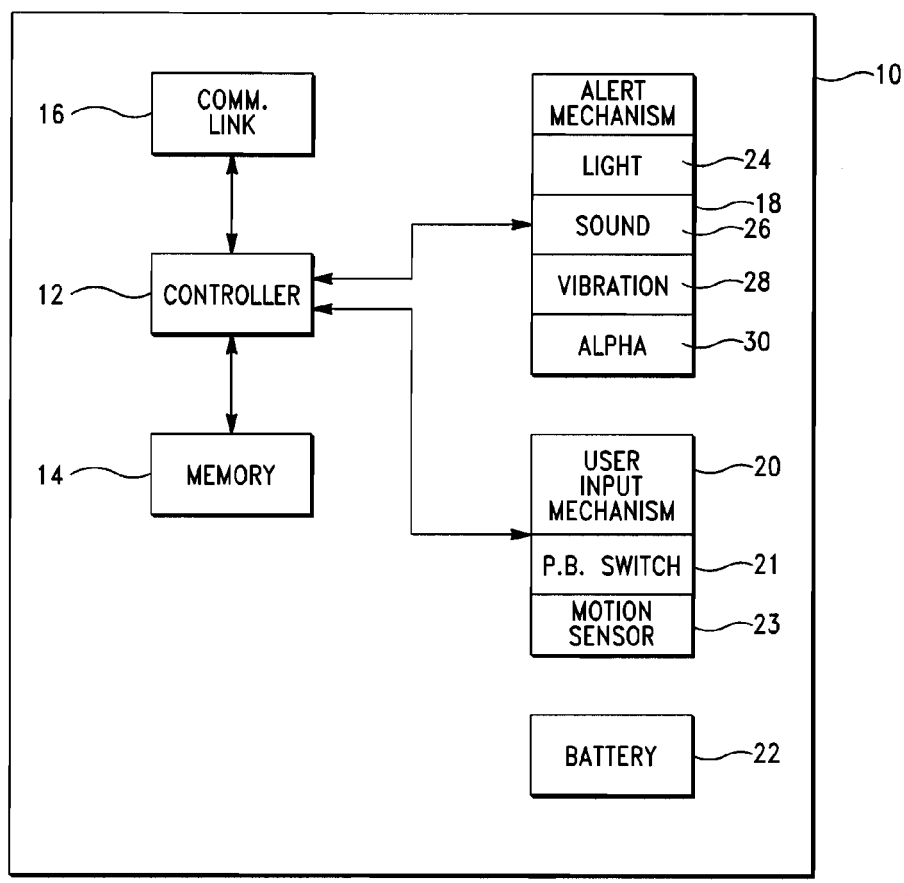
FIG. 1 is a block diagram of a components of a notification device in accordance with an exemplary embodiment of the present invention.

Turning to FIG. 1, a notification device in accordance with an exemplary embodiment of the present invention is depicted generally by the numeral 10. Notification device 10 comprises a controller 12 coupled to a memory device 14 and to a communications link 16. Processor 12 is further coupled to an alert mechanism 18 and to a user input mechanism 20. Battery 22 supplies power to the components and circuitry of the notification device in a manner known to those skilled in the art.

Controller 12 is preferably a microprocessor or microcontroller operable to execute a series of instructions stored either in internal non-volatile memory, or stored in memory device 14 external to the processor. Execution of the instructions on the controller direct the notification device to operate the exemplary methods as described herein. Controller 12 is in electrical communication with communications link 16, memory device 14, alert mechanism 18 and user input mechanism 20 such that the controller can monitor user inputs (e.g., push button switch or motion sensor inputs via user input mechanism 20) initiate alerts (e.g., sound, light, vibration, alphanumeric, via alert mechanism 18), transmit and receive data to and from a coupled cellular telephone (e.g. Bluetooth via communications link 16), and store and recall instructions and configuration parameters (e.g., operating parameters via memory device 14). Preferably, controller 12 executes a baseline series of instructions to communicate with each of the component subsections (communications link 16, memory device 14, alert mechanism 18, and user input mechanism 20) to provide basic operation of the notification device. In addition, as will be explained in more detail below, controller 12 may alter configurable parameters of the notification device, preferably stored in memory device 14, in response to information received from a coupled cellular telephone and in response to user inputs, thus adapting the operation of the notification device as desired.

Communications link 16 comprises circuitry operable to provide a wireless communication channel between the notification device 10 and a cellular telephone having a comparable compatible communications link. The communications circuitry includes all necessary transmitting and receiving circuitry and components, such as antenna circuitry for radio frequency (RF) communication. Communications link 16 is preferably a radio-frequency (RF) link implementing a Bluetooth communications protocol including the BLE (Bluetooth low energy) protocol, allowing bidirectional communication between the notification device and a paired cellular telephone. In operation, communications link 16 is coupled to controller 12 so that information may be transmitted to, and received from, the paired cellular telephone. Other RF communication protocols and frequencies may also be implemented within the scope of the present invention. Likewise, other non-RF technologies may be employed, such as infrared or other light communication links, or inductively coupled links.

Memory device 14 is preferably comprises non-volatile memory operable to store instructions for controller 12 and/or configuration parameters used by controller 12 to indicate the status of various inputs and outputs and to track and store information received from a coupled cellular telephone. Memory device 14 may also include volatile memory used for temporary storage of values and parameters as instructions are executed on the coupled controller. Memory device 14 may likewise comprise random access memory (RAM), read-only memory (ROM), or combinations thereof.

Alert mechanism 18 comprises one or more user alerts, including a light alert 24, a sound alert 26, a vibration alert 28, and an alphanumeric alert 30, or combinations thereof.

Light alert 22 is preferably comprised of one or more light-emitting diodes (LEDs) that illuminate or turn-off as commanded by controller 12 to alert a user to an event or activity on the cellular telephone. For example, a flashing red LED could be commanded by the controller to indicate an incoming call, with a solid red LED indicating a received text message. Or, a plurality of LEDS may be used, with each indicating a specific activity, e.g., one LED to indicate incoming calls, one to indicate text messages, etc. Alternatively, multicolor LEDs may be used to indicate multiple events or activities. Instead of LEDs, light alert 22 may alternatively employ incandescent, neon, or other light sources known in the art.

Sound alert 24 preferably comprises a piezeo electric device capable of generating an audible sound in response to a command from the controller. Multiple alert devices may be used, each having a different sound to indicate a distinct activity, or a single device may be used to provide alerts of varying frequency, or activated in varying patterns. Sound alert 24 may alternatively comprise sound generating circuitry and a conventional loudspeaker, or may comprise any other sound generating device known in the art.

Vibration alert 26 preferably comprises a micro vibration motor operable to provide a vibrating or buzzing alert when commanded by controller 12. As with the light and sound alerts just described, the vibration alert may be activated to indicate a specific event or activity, or may be used in combination with the other alerts, for example the vibration alert may be activated in conjunction with any of the light alerts to provide a dual mode alert to the user of activity or events on the phone.

Alphanumeric alert 28 preferably comprises an LCD alphanumeric display capable of displaying data provided by controller 12. The desired alphanumeric text is commanded by the controller in response to events or activities detected on the phone, or may alternatively be used to provide user instructions or other device information to the user. Other display technologies, such as LED or touch screens may also be used, in which case the touch screen also function as a user-input device.

Alert mechanism 18 thus provides numerous varieties of alerts that may be displayed to users. For example, an illuminated (or flashing) red LED could indicate an incoming call, and an illuminated green LED could indicate a received text message. Likewise, a sound alert and/or vibration alert could be used to indicate an incoming call, or the alphanumeric display could be used to indicate caller ID information relating to an incoming call. It should be understood that an alert device in accordance with the present invention need not have every type of alert described herein, and that the operation of the various alerts may vary within the scope of the present invention depending on the programming of the controller and the status of the various configurable parameters of the device as will be discussed in more detail below. For example, the device may include only a single LED and a sound alert (with no vibration or alphanumeric alerts), and the LED may be illuminated to indicate any activity on the cellular phone, such as an incoming call, text, or email, with the sound alert activated only to indicate an incoming call. These and other variations are anticipated by the present invention and will be apparent to those skilled in the art.

User input mechanism 20 preferably comprises at least one push-button switch 21 operable by a user to provide input to controller 12. Upon detection of a user pressing the push button switch, the controller may execute a specific, predefined action, or may execute a context-dependent action based upon configurable parameters. For example, when the notification device is not paired or in communication with a cellular telephone, depressing the push button switch may turn-on or wake-up the device and cause it to attempt to establish a communication link with a nearby cellular telephone. However, if the device is already in communication with a cellular telephone, depressing the pushbutton switch may silence an activated sound alert or extinguish an already-illuminated LED. User input mechanism 20 may further include a motion sensor 23 to detect movement, or a lack of movement, of the device. Upon detection of motion (or a lack of motion for a period of time), the controller may execute a defined action, or context-dependent action. For example, if the device is in a power-saving or sleep mode, detection of movement can cause the controller to wake-up the device and resume normal operation. Or, upon detection of a lack of motion for a period of time (e.g., ten minutes) the controller could command the device to enter a power-saving or sleep mode. Motion sensor 23 may be any motion sensing device known in the art, such as an accelerometer, a piezoelectric sensor, or mechanical pendulum or mercury switches.

User input mechanism 20 may similarly employ a plurality of pushbutton switches, each having a function defined by controller 12, or may employ other input mechanisms, such as a keypad, touch screen (which may be in combination with an alphanumeric display as described above, or other input device known in the art.

Battery 22 is preferably one or more replaceable batteries, connected to power the above-described circuitry as is well-known in the art. Alternatively, battery 22 may be a rechargeable battery used in conjunction with an external charger, or may be any other power source known in the art.

It should be understood that while FIG. 1 depicts controller 12, memory device 14, and communications link 16 as separate components, variations of this depiction are within the scope of the present invention. For example, a single microprocessor or microcontroller chip including a controller, memory, and a communications link on a single device may be employed. Likewise, application specific integrated circuitry may be used to implement the necessary functionality of the controller, memory, and communications link. Alternatively, controller 12, memory device 14, and communications link 16 may be comprised of discrete circuitry, such as digital logic circuitry and/or analog circuitry configured to operate in a predefined manner to execute specific steps in a manner similar to that of a microcontroller as defined above. These and other variations are within the scope of the present invention.

Figure 2:
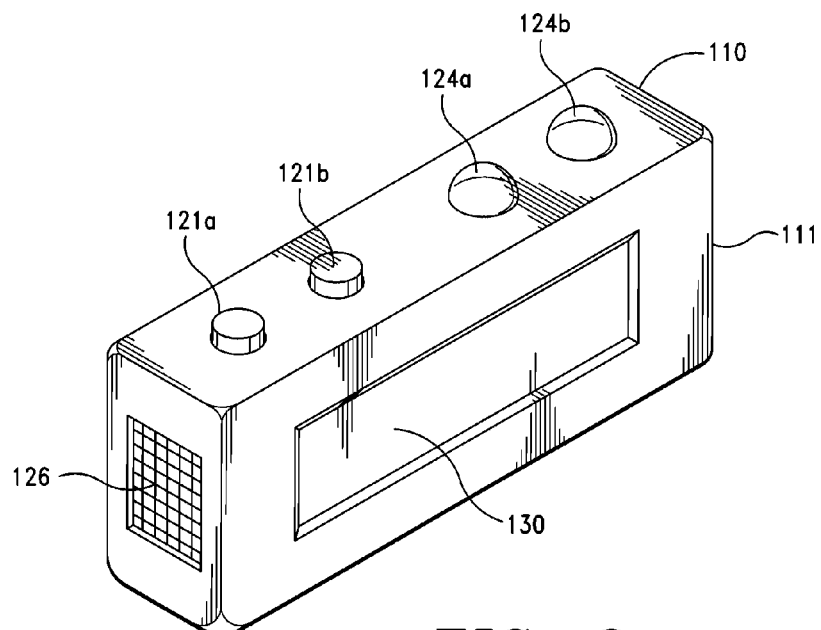
FIG. 2 is a perspective view of a notification device in accordance with an exemplary embodiment of the present invention.

Turning to FIG. 2, a perspective view of an exemplary embodiment of a notification device of the present invention is depicted generally by the numeral 110. Notification device 110 includes a plurality of pushbutton switches 121a, 121b to allow user input to the device, a plurality of LEDs 124a, 124b to provide light alerts to a user, a sound alert 126, and an alphanumeric display 130. All components and circuitry are contained in a case 111, which is preferably sized to be easily carried by a user or placed in a pocket. It should be understood that the notification device 110 includes internally the controller, memory, communications link, and battery components and circuitry as described in the embodiment above, functioning in a manner as described above. It should be further understood that the embodiment depicted is exemplary, and that variations in the alert mechanism and user input mechanism are within the scope of the present invention. For example, while two pushbutton switches, two LEDs, and an alphanumeric display are depicted, a notification device in accordance with the present invention may include, for example, a single LED and a single pushbutton, with no alphanumeric display.

Figure 3:
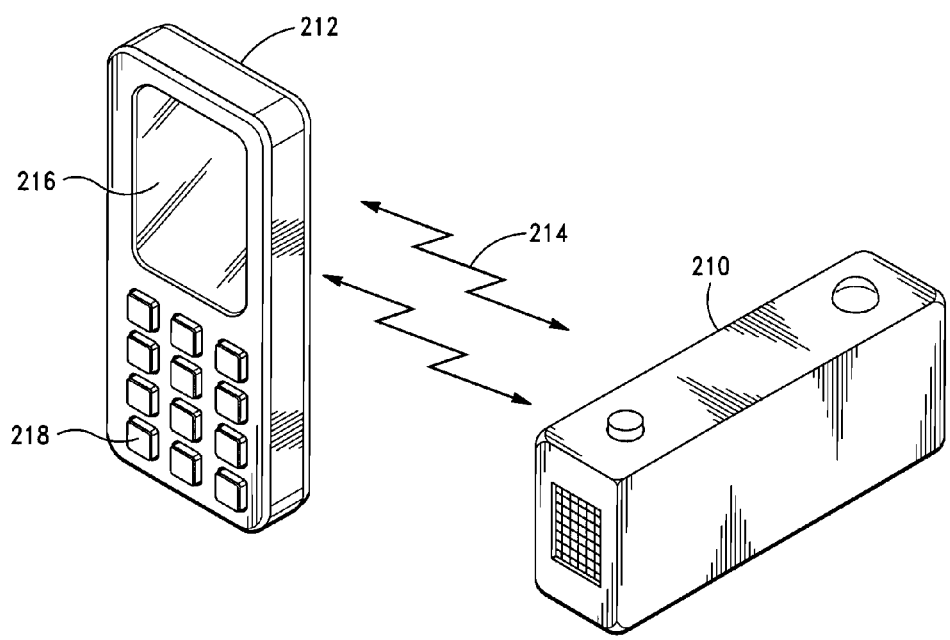
FIG. 3 is a diagram of an exemplary embodiment of the notification device of the present invention in use with a cellular telephone.

Looking to FIG. 3, a notification device 210 in accordance with an exemplary embodiment is shown in communication with a cellular telephone 212 via an established communication channel 214. As described above, notification device 210 includes a communications link operable to establish communication with a cellular telephone, for example, using a Bluetooth protocol. Cellular telephone 212 likewise includes a compatible communications link, allowing the notification device 210 and the cellular telephone to bi-directionally exchange data. Cellular telephone 212 preferably includes an operating system capable of running communications drivers or applications to allow communication over a Bluetooth link, and also capable of running user applications. Operation of the telephone display 216 and monitoring of the telephone keypad 218 input is likewise preferably handled by the telephone's operating system. In operation, information relating to events and activity occurring on the telephone (e.g., incoming calls, received text messages, received emails) is transmitted via communications channel 214 to the notification device 210. For example, upon receiving an incoming call, the telephone 212 transmits a message over the communications channel 214, to the notification device 210 which receives the message, recognizes it as an "incoming call" message, and activates a desired alert, such as flashing an LED. Preferably, the transmitting and receiving of messages over communications channel 214 occurs in the operating system of the phone or in a background application that is always running on the phone.

Alternatively, or in addition to, the background transmitting and receiving application, the telephone may run a user interface application specifically directed to communicate with and configure the notification device. For example, a user interface presented on the display screen 216 of telephone 212 may include configuration of the various light, vibration, and sound alerts on the notification device 210. Thus, using the application running on the telephone, a user may choose to configure the notification device to: light an LED and sound an alert upon receipt of an incoming call, and sound a vibration alert upon receipt of a text message, or a user may configure any combination of desired alerts in response to any desired user input or information received from the phone.

Figure 4:
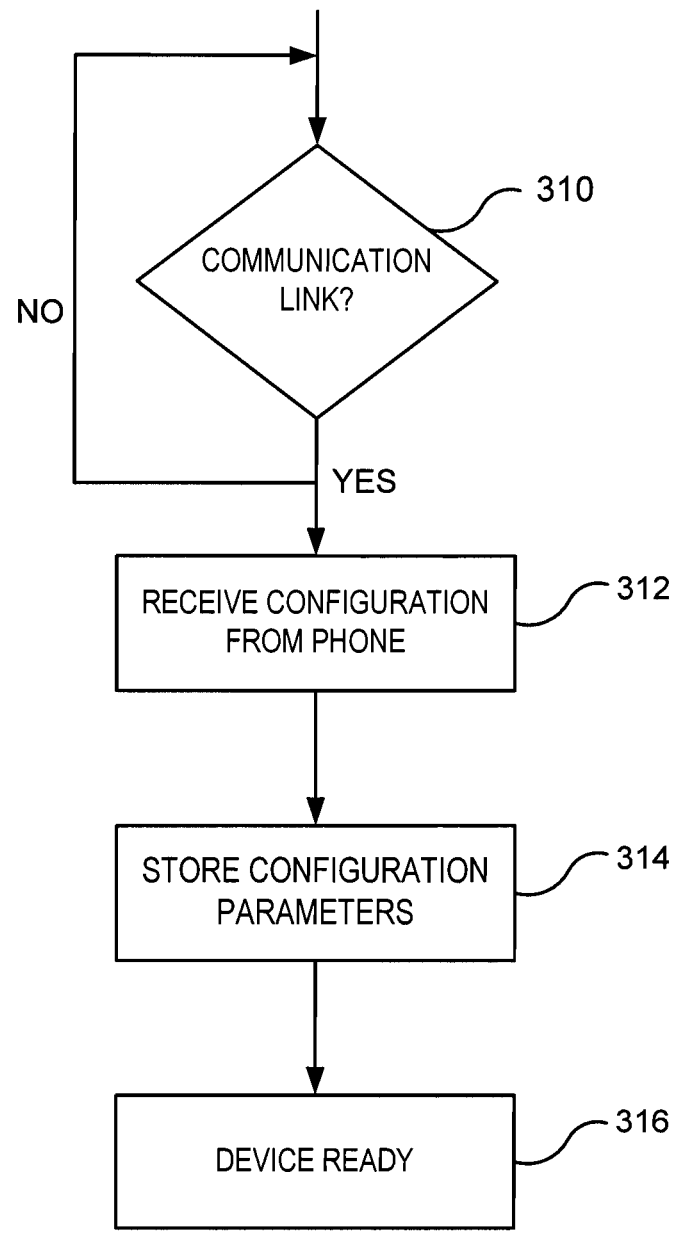
FIG. 4 is a flow diagram of an exemplary operational mode of the notification device of the present invention receiving configuration data from a cellular telephone.

As shown in FIG. 4, these configuration parameters are transmitted to, and stored in, the notification device. With a communications link established between the phone and the notification device at 310, the notification device receives the configuration parameters from the phone at 312. After receipt, the notification device stores those parameters 314 in the devices memory, as previously described. With the configuration parameters stored, the device is then ready to operate 316 in accordance with those parameters. It should be understood that the notification device may be initially programmed with default operating parameters (e.g., the device is shipped from the factory with specific operating parameters), and that a user may choose to not alter those predefined parameters.

In addition to the incoming call, text message, and other events previously described, the notification device may also be configured to provide alerts or alter the device configuration based upon other events or activities on the phone as will now be described.

The notification device may be configured to provide alerts, or alter its alert configuration, based upon geographic location information received from the phone. A cellular telephone having global positioning system circuitry can provide information related to its geographic location, and can transmit location coordinate or a location specific message to the notification device. Upon receipt of that message or coordinate, the notification device will activate a desired alert. For example, the telephone could be configured to transmit a message to the notification device whenever it was located at a specific location or locations (e.g., home, office, on a commute). The notification device, would then, for example, disable all alerts to conserve device power, or alter the configuration of all alerts to vibration only to prevent distractions to a user. Likewise, a similar message could be sent upon exiting any of the specific locations and the configuration of the alerts could be returned to their previous state, or could be set to a new configuration.

Similarly, the notification device may be configured to provide alerts, or alter its alert configuration, based upon time of day information received from the phone. A cellular telephone having a clock or timekeeping function can transmit that time information to the notification device. Upon receipt of that time information, the notification device can activate a desired alert, or can alter the configuration of the device's parameters that control the alerts. For example, the telephone could be configured to transmit a message to the notification device at 12 o'clock p.m. instructing the device to disable all alerts, and send another message at 1 o'clock p.m. instructing the device to reinstate the previous configuration of alerts, or reconfigure the alerts to a new configuration. Alternatively, the notification device could include clock or timekeeping circuitry so that once set (for example, by receiving a one-time or periodic time signal from the phone), the device itself keeps track of elapsed time and reconfigures the alerts after a specific elapsed time, or at the same time each day, etc.

The notification device can also be configured to activate various alarms, or change the configuration of the device, based upon a detected battery voltage of the device. Thus, for example, the device could monitor the battery voltage and provide an LED signal indicating a low battery, or a varying alert depending on how low the battery voltage has dropped. The notification device can be further configured to receive a "locate device" message from the telephone and to sound an audio alert (or all alerts) to allow location of the device.

A priority alert feature may be configured in which the device responds to activity from specific "priority" contacts (phone numbers, emails, text messages, etc.) sent from the cellular phone and sounds an alarm (regardless of any other configuration parameters) when the incoming contact information matches "priority" contact information programmed into the cellular telephone, thus providing a priority alert and/or override to notify a user of an important phone call. In a preferred embodiment, a priority alert message is sent from the cellular telephone to the device based on information and/or activity at the cellular telephone and the application running on the cellular telephone. In an alternative embodiment, a user's contacts on the cellular phone (either a complete list, or an abbreviated list) are referenced by the device and used to assign the desired priority alerts to particular phone numbers, email addresses, or other identifying information. Alternatively, contact information may be downloaded to the device and the comparison made at the device level. The device may also detect when an incoming call from the same phone number occurs within a specified period of time—e.g., three calls from the same phone number within two minutes—and activate an alert in response. Other configurations of alerting a user to priority or emergency phone calls may also be implemented in the device.

Similarly, the device may be programmed to provide unique alerts assigned to various contacts' phone numbers, email addresses, and the like, so that a specific alert can be attributed to a particular phone number or message, in a manner similar to Caller-ID or unique ringtones assigned to callers on a cellular telephone. In a preferred embodiment, a message commanding a specific alert (e.g. a unique ringtone) is sent from the cellular telephone to the device based on information and/or activity at the cellular telephone and the application running on the cellular telephone. In an alternative embodiment, a user's contacts on the cellular phone (either a complete list, or an abbreviated list) are referenced by the device and a configuration set-up on the cellular telephone is used to assign the desired alerts to particular phone numbers, email addresses, or other identifying information. Alternatively, contacts may be downloaded to the device and the comparison made at the device level.

Because the device is in bidirectional communication with the cellular telephone, the notification device can also be configured to initiate commands to the paired telephone. For example, the notification device could send a "locate phone" command, initiated by a double press of a user input push button, with the phone programmed to responds to that command by sounding an alarm or ringer, allowing location of the telephone. In the event the device loses or drops its communication link with the phone, the controller could command the device into a power-saving or sleep mode to conserve battery power. The sleep mode may be exited upon detection of a user pressing a push button, for example, or by movement of device detected by the motion sensor as described above.

The configurable parameters of the device and the monitoring of inputs, outputs and parameters by the controller also allows the device to record and adaptively learn specific configurations. For example, the notification device could record the time of day that the user typically turns off the device, and configure its parameters to then automatically shut-down at that same time every day. Or the device could monitor user activity on the phone and/or device and alter the configuration of the device to implement that activity—for example if the user always places the device in vibrate mode just before placing a call on the phone, the device would record that activity and could automatically configure itself to set to vibrate mode when the user places a call.

In another aspect of the present invention, the application running on the cellular phone and in communication with the notification device could be configured to monitor, log, and report various activity on the phone and the notification device to the user. For example, the application may notify the user of a registration process available to register the device with a manufacturer. Additionally, the application may compile a summary of activity on the phone and/or device and send a periodic report to the user via email, text messaging, or other communications means. For example, a weekly report detailing all missed calls could be sent to a user, along with information as to how the device responded to those and other calls.

It should be noted that the above exemplary embodiments of operation of the device are examples of various configurations of the notification device that may be implemented, and that combinations and variations of the described implementations are within the scope of the present invention.

With the notification device and exemplary implementations set forth as described above, the use and operation of the device will be described in conjunction with FIGS. 1-4. A user, having a cellular telephone 212 and a notification device 210 as shown in FIG. 3, establishes a communication channel 214 between the two. Preferably, the communications channel is a Bluetooth protocol link, established by initiating the set-up application on the phone and initiating a start-up sequence on the notification device (e.g., by powering on the device or by pressing a push button user input switch). As seen in FIG. 4, with communication established the notification device receives configuration information from the phone, and the device is ready for use in accordance with the configuration parameters that have been stored in the memory of the device.

As seen in FIGS. 1 and 2, and as described above, operation of the notification device proceeds in accordance with the instructions executed by the controller and in accordance with the configurable parameters stored in the memory—the combination of which defines the operation of the device. For example, in a typical operation, with the notification device and the cellular telephone paired (i.e., in communication with each other over a Bluetooth communication channel), an incoming call to the telephone initiates a message sent to the notification device over the communication channel. The message is received by the notification device via communications link 16, the controller 12 then processes the received "incoming call" message and activates one or more of the alerts on alert mechanism 18, depending on the configuration parameters stored in memory 14. For instance, the configuration parameters may dictate that an incoming call activate a light and a vibration alert, in which case the controller commands those alerts. A user, upon noticing the alerts may press a push button or other user input, having been notified of the incoming call. The controller, upon detecting the user input, then deactivates the alerts. As described in more detail above, various configurations of user inputs and alert mechanisms can be set based upon various conditions or activities, or based upon user choices in setting up and configuring the device.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and sub combinations are of utility and may be employed without reference to other features and sub combinations. This is contemplated by and is within the scope of the claims.

What is claimed and desired to be secured by Letters Patent is as follows:

1. A notification device for a personal communications device, comprising:
    a communication link to enable communication between the notification device and the personal communications device;
    an alert mechanism to provide at least one alert;
    a controller in communication with the communication link and the alert mechanism wherein the controller comprises at least one processor to receive configuration information from the personal communications device, the configuration information comprising at least one incoming communication notification alert type selected from a group consisting of a known contact alert, an unknown contact alert, a priority contact alert, a repeat alert, and a context-sensitive alert, receive an alert message from the personal communications device, the alert message indicating the personal communications device received an incoming communication, and activate the alert mechanism in response to the received alert message and in accordance with the configuration information; and
    a memory device in communication with the controller to store the configuration information.

2. The notification device of claim 1, wherein the alert mechanism generates at least one of a sound alert, a light alert, an alphanumeric alert, and a vibration alert.

3. The notification device of claim 1, wherein the at least one processor changes configurable parameters in response to the received configuration information.

4. The notification device of claim 1, wherein the configuration information comprises an alert configuration and the at least one processor receives geographical location information from the personal communications device and changes the alert configuration based on the geographical location information.

5. The notification device of claim 1, wherein the configuration information comprises an alert configuration and the at least one processor receives a current time from the personal communications device and changes the alert configuration based on the current time.

6. The notification device of claim 1, further comprising at least one user input mechanism, and wherein the at least one processor monitors and stores in the memory device activity of the at least one user input mechanism, and updates the configuration information in response to the activity of the at least one user input mechanism.

7. The notification device of claim 6, wherein the user input mechanism comprises at least one of a push-button switch and a motion sensor.

8. The notification device of claim 1, wherein the at least one processor transmits a signal to the personal communications device to activate an alarm of the personal communications device.

9. The notification device of claim 1, wherein the at least one processor monitors a battery level of a battery of the notification device and the alert mechanism generates an alarm when the battery level is less than a predetermined value.

10. The notification device of claim 1, wherein the communication link comprises at least one of a Bluetooth link, a Radio Frequency link, and an infrared link.

11. The notification device of claim 10, wherein the communication link is the Bluetooth link, and wherein the at least one processor receives notification of an incoming call via the Bluetooth link.

12. The notification device of claim 1, wherein the notification device receives the configuration information via an application running on the personal communications device.

13. A notification device for a personal communications device, comprising:
    a communication link to communicate with the personal communications device;
    an alert mechanism to provide at least one alert; and
    a controller in communication with the communication link and the alert mechanism, the controller comprising at least one processor to receive configuration information from the personal communications device, the configuration information comprising at least one incoming communication notification alert type selected from a group consisting of a known contact alert, an unknown contact alert, a priority contact alert, a repeat alert, and a context-sensitive alert, receive an alert message from the personal communications device indicative of an activity that occurs on the personal communications device, and activate an alert in response to the activity that occurs on the personal communications device and in accordance with the configuration information.

14. The notification device of claim 13, wherein the alert mechanism generates at least one of a sound alert, a light alert, an alphanumeric alert, and a vibration alert.

15. The notification device of claim 13, wherein the at least one processor changes configurable parameters in response to the configuration information from the personal communications device.

16. The notification device of claim 15, wherein the configuration information comprises an alert configuration and the at least one processor changes the alert configuration based on at least one of geographical location information, time of day information, and user input information.

17. The notification device of claim 13, wherein the at least one processor transmits a command instructing the personal communications device to activate an alarm.

18. The notification device of claim 13, wherein the at least one processor monitors a battery level of a battery of the notification device activates the alert mechanism based on the battery level.

19. The notification device of claim 13, wherein the notification device comprises a motion sensor, and wherein the at least one processor detects a signal from the motion sensor and wakes-up the notification device from a power-saving mode.

20. The notification device of claim 13, wherein the at least one processor enters a power-saving mode of the notification device in response to detecting a loss of communication with the personal communications device.

21. The notification device of claim 13, wherein the at least one processor receives a phone number of an incoming call from the personal communications device, compares the phone number of the incoming call to at least one stored phone number in a memory of the notification device, determines that the phone number of the incoming call matches a particular phone number of the at least one stored phone number, and activates a predetermined alert.

22. The notification device of claim 1, wherein the at least one processor receives a phone number of an incoming call from the personal communications device, compares the phone number of the incoming call to at least one stored phone number in the memory device of the notification device, determines that the phone number of the incoming call matches a particular phone number of the at least one stored phone number, and activates a predetermined alert.

23. The notification device of claim 1, wherein the at least one processor receives from the personal communications device information related to activity of the personal communications device, stores the information related to the activity of the personal communications device in the memory device, and updates the configuration information in response to the information related to the activity of the personal communications device.

24. A method for providing a notification to a notification device, comprising:
  establishing, by at least one processor, a communication link to enable communication between the notification device and a personal communications device;
  receiving, by the at least one processor, configuration information from the personal communications device, the configuration information comprising at least one incoming communication notification alert type selected from a group consisting of a known contact alert, an unknown contact alert, a priority contact alert, a repeat alert, and a context-sensitive alert;
  storing, by the at least one processor, the configuration information in a memory device;
  receiving, by the at least one processor, an alert message from the personal communications device, the alert message indicating the personal communications device received an incoming communication;
  activating, by the at least one processor, an alert mechanism in response to the received alert message and in accordance with the configuration information; and
  providing, by the at least one processor, at least one alert by the alert mechanism.

25. The method of claim 24, further comprising generating, by the alert mechanism, at least one of a sound alert, a light alert, an alphanumeric alert, and a vibration alert.

26. The method of claim 24, further comprising changing configurable parameters in response to the received configuration information.

27. The method of claim 24, wherein the configuration information comprises an alert configuration, the method further comprising receiving geographical location information from the personal communications device and changing the alert configuration based on the geographical location information.

28. The method of claim 24, wherein the configuration information comprises an alert configuration, the method further comprising receiving a current time from the personal communications device and changing the alert configuration based on the current time.

29. The method of claim 24, further comprising monitoring and storing in the memory device activity of at least one user input mechanism, and updating the configuration information in response to the activity of the at least one user input mechanism.

30. The method of claim 29, further comprising monitoring and storing in the memory device activity of the at least one user input mechanism, the at least one user input mechanism comprising at least one of a push-button switch and a motion sensor.

31. The method of claim 24, further comprising transmitting a signal to the personal communications device to activate an alarm of the personal communications device.

32. The method of claim 24, further comprising monitoring a battery level of a battery of the notification device and generating an alarm when the battery level is less than a predetermined value.

33. The method of claim 24, further comprising establishing the communication link to enable communication, wherein the communication link comprises at least one of a Bluetooth link, a Radio Frequency link, and an infrared link.

34. The method of claim 24, further comprising establishing the communication link to enable communication using a Bluetooth link and receiving notification of an incoming call via the Bluetooth link.

35. The method of claim 24, further comprising receiving the configuration information via an application running on the personal communications device.

36. The method of claim 24, further comprising receiving a phone number of an incoming call from the personal communications device, comparing the phone number of the incoming call to at least one stored phone number in the memory device, determining that the phone number of the incoming call matches a particular phone number of the at least one stored phone number, and activating a predetermined alert.

37. The method of claim 24, further comprising receiving from the personal communications device information related to activity of the personal communications device, storing the information related to the activity of the personal communications device in the memory device, and updating the configuration information in response to the information related to the activity of the personal communications device.

* * * * *